(12) United States Patent
Wu

(10) Patent No.: US 12,348,270 B2
(45) Date of Patent: Jul. 1, 2025

(54) OPTICAL TRANSMISSION DEVICE

(71) Applicant: EZCONN CORPORATION, New Taipei (TW)

(72) Inventor: Chin-Tsung Wu, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 0 days.

(21) Appl. No.: 18/199,950

(22) Filed: May 20, 2023

(65) Prior Publication Data

US 2023/0379058 A1 Nov. 23, 2023

Related U.S. Application Data

(60) Provisional application No. 63/342,851, filed on May 17, 2022.

(51) Int. Cl.
*H04B 10/00* (2013.01)
*H04B 10/40* (2013.01)

(52) U.S. Cl.
CPC .................................. *H04B 10/40* (2013.01)

(58) Field of Classification Search
CPC .... H04B 10/40; H04B 10/2507; H04B 10/27; H04B 10/071; H04J 14/02; H04J 14/0227; G02B 6/4246; G02B 6/2938; G02B 6/4214; G02B 6/4215; G02B 6/29362

USPC ....... 398/135, 136, 137, 138, 139, 158, 159, 398/79, 82, 85, 87, 66, 67, 68, 69, 70, 71, 398/72, 16, 33, 38, 164; 385/24, 37, 88, 385/89, 90, 92, 93

See application file for complete search history.

(56) References Cited

U.S. PATENT DOCUMENTS

| | | | | |
|---|---|---|---|---|
| 5,867,622 | A * | 2/1999 | Miyasaka | G02B 6/32 385/88 |
| 7,309,172 | B2 * | 12/2007 | Okada | G02B 6/29361 385/92 |
| 7,505,650 | B1 * | 3/2009 | Grzybowski | C03B 23/02 65/106 |
| 9,331,781 | B2 * | 5/2016 | Ota | H04B 10/2589 |
| 9,391,695 | B2 * | 7/2016 | Piehler | H04B 10/071 |
| 2021/0148786 | A1 * | 5/2021 | Kang | G01M 11/3136 |

* cited by examiner

*Primary Examiner* — Hanh Phan

(74) *Attorney, Agent, or Firm* — Rankin, Hill & Clark LLP

(57) ABSTRACT

An optical transmission device includes a light guiding unit, a light path conversion unit, a light receiving and transmitting unit, and a light absorption unit. The light guiding unit is connected to an optical fiber and is suitable for transmitting optical signals. The light path conversion unit is connected to the light guiding unit and is suitable for receiving optical signals and changing the optical path of the signals. The light absorption unit is used to receive reflected optical signals. By configuring two receiving elements and two transmitting elements in the light receiving and transmitting unit, the device can simultaneously support optical transmission and the use of an optical time-domain reflectometer on the same optical path.

20 Claims, 6 Drawing Sheets

OPTICAL TRANSMISSION DEVICE

RELATED APPLICATIONS

This application claims priority to U.S. Provisional Patent Application No. 63/342,851, filed on May 17, 2022, which is incorporated herein by reference in its entirety.

TECHNICAL FIELD

The present invention relates to an optical transmission device, particularly to an optical transmission device that includes an optical time-domain detection component in the optical transceiver, which can instantly detect the transmission status of optical signals.

BACKGROUND

With the increasing demand for high performance and speed, the use of optical fibers in communication has become more widespread. In optical communication systems, light is used to transmit data over long distances via optical pulses instead of electrical currents through optical fibers. Optical transceivers are important components of communication systems and can be classified based on the fiber mode, transmission rate, distance, wavelength, and connector type. In the field of optical fiber cable communication, the transceiver plays a pivotal role and its main function is to convert optical signals into electrical signals, or vice versa. One type of transceiver is a bidirectional optical sub-assembly (BOSA), which consists of a bidirectional optical sub-component.

BOSA uses two independent wavelength channels, one for transmitting and receiving between a single optical fiber and interconnecting devices, with the transmitting wavelength on one end matching the receiving wavelength on the other end. BOSA can send (Tx) and receive (Rx) data.

Generally, BOSA is composed of an optical transmitter, which includes a laser diode, an optical receiver with an optical source, a filter that allows light of one wavelength to pass through but reflects light of another wavelength, and an optical transceiver that can simultaneously output transmit light and input receive light, all enclosed in a casing. Tx data is transmitted through the wavelength filter after passing through the optical transmitter and then transmitted to the optical fiber in the optical connector, while Rx data is transmitted through the filter after passing through the optical fiber and then transmitted to the optical receiver.

In the process of transmitting optical signals, an optical time-domain reflectometer is usually required to detect the transmission of optical signals in the optical fiber. In a prior art, as shown in FIG. 1, an optical time-domain reflectometer needs to be additionally installed outside the BOSA in the optical transmission submodule 10 of the prior art to detect the overall transmission of optical signals and to detect the condition of each optical fiber. However, the cost of an optical time-domain reflectometer is high, and it requires additional space for installation, causing significant problems in component arrangement.

In view of the above, there are many bottlenecks in the prior art. The present invention overcomes the above problems and provides a practical optical transmission device.

SUMMARY

The purpose of this invention is to provide an optical transmission device that integrates an optical time-domain reflectometer to solve the problem of needing to set up an additional optical time-domain reflectometer in conventional technology.

Another purpose of this invention is to provide an optical transmission device that solves the problem of signal distortion due to scattering during signal transmission by providing an escape hole on the opposite side of the second filter and the second receiver and coating a part of the surface of the optical guide unit and the optical path conversion unit with an optical absorption layer.

To achieve the above purposes, this invention provides an optical transmission device comprising an optical guide unit, an optical path conversion unit, an optical receiver-transmitter unit, and an optical absorption unit. The optical guide unit is connected to an optical fiber and is suitable for transmitting at least one optical signal, which is non-single wavelength. The optical path conversion unit is connected to the optical guide unit and is suitable for receiving the at least one optical signal and changing the optical path of the at least one optical signal. The optical path conversion unit sequentially includes a focusing lens, a first filter, a second filter, and a third filter in the direction facing the optical guide unit. The optical receiver-transmitter unit is suitable for receiving and transmitting the at least one optical signal and includes a first receiver, a second receiver, a third transmitter, and a fourth transmitter. The first receiver corresponds to the first filter, and the second receiver corresponds to the second filter. The third transmitter corresponds to the third filter. The fourth transmitter corresponds to the third filter, and the first receiver and the second receiver correspond to one of the third transmitter and the fourth transmitter, respectively. The optical absorption unit is suitable for absorbing an optical signal of a fixed wavelength range and includes an escape hole and an absorption coating. The escape hole corresponds to the second filter, and the absorption coating is disposed around the escape hole, the focusing lens, and at least a portion of the surface of the optical guide unit.

In some embodiments of the present invention, when the at least one optical signal is transmitted to the first filter, the incident angle of the at least one optical signal into the first filter is between 40 degrees and 50 degrees.

In some embodiments of the present invention, when the at least one optical signal is transmitted to the second filter, the incident angle of the at least one optical signal into the second filter is between 40 degrees and 50 degrees.

In some embodiments of the present invention, when at least one optical signal is transmitted to the third filter, the incident angle of the at least one optical signal entering the third filter is between 40 and 50 degrees.

In some embodiments of the present invention, the first receiver receives a wavelength range between 1260 and 1280 nm.

In some embodiments of the present invention, the second receiver receives a wavelength range between 1615 and 1660 nm.

In some embodiments of the present invention, the third transmitter transmits a wavelength range between 1615 and 1660 nm.

In some embodiments of the present invention, the fourth transmitter transmits a wavelength range between 1575 and 1580 nm.

In some embodiments of the present invention, the optical absorption unit absorbs at least a portion of the light signal reflected from the second filter.

In some embodiments of the present invention, the optical absorption unit absorbs at least a portion of the light signal reflected from the surface of the optical guide unit.

In some embodiments of the present invention, the escape hole has a depth between 1 mm and 2 mm.

In some embodiments of the present invention, the escape hole has an aperture diameter between 0.5 mm and 1 mm.

In some embodiments of the present invention, the escape hole has a blind hole angle between 60 and 120 degrees.

In summary, the present invention proposes an optical transmission device that combines an optical transmission device and an optical time-domain reflectometer into an integrated structure through optical design, and uses specific wavelength range light signals as detection pulse light to receive information such as connection and disconnection of light signals from various optical networks within the original space of the optical transmission device. This not only reduces the space cost of the overall structure, but also reduces the component cost because there is no need to install a separate optical time-domain reflectometer. Furthermore, by setting up an optical absorption unit, the scattering of light signals due to contact with a reflective surface can be greatly reduced, reducing the problem of optical crosstalk and enabling good transmission of light signals in the optical transmission device.

The foregoing and other components, steps, features, benefits and advantages of the present invention become apparent from the following detailed description of exemplary embodiments, the accompanying drawings, and the appended claims.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of coaxial cable connector incorporating aspects of the presently disclosed principles are illustrated by way of example, and not by way of limitation.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

The disclosed embodiment in this case is an optical transmission device. For example, the optical transmission device can be installed in the Optical Line Terminal (OLT) of a Passive Optical Network (PON) system, which has two functions: firstly, to complete the upstream access of the PON network, and secondly, to distribute the acquired data to all user terminals (ONUs) through the Optical Distribution Network (ODN) via optical signals.

Figure 1:
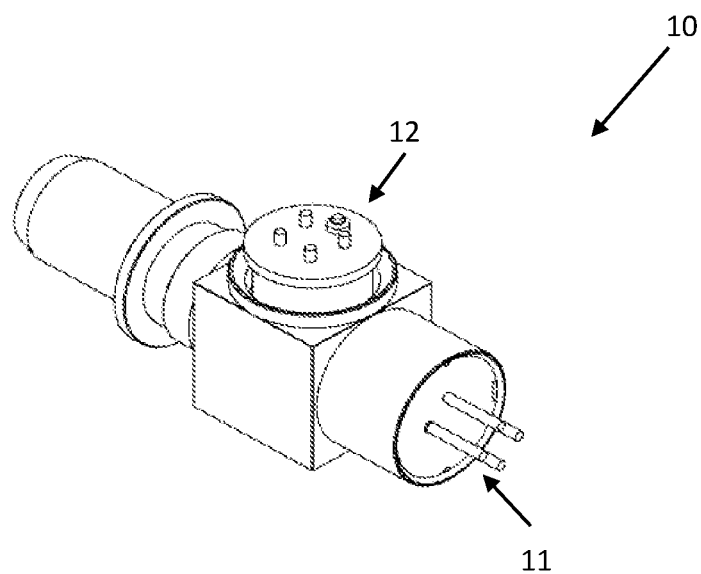
FIG. 1 is a schematic diagram of the structure of a sub-module for optical transmission in the known technology.
Figure 2:
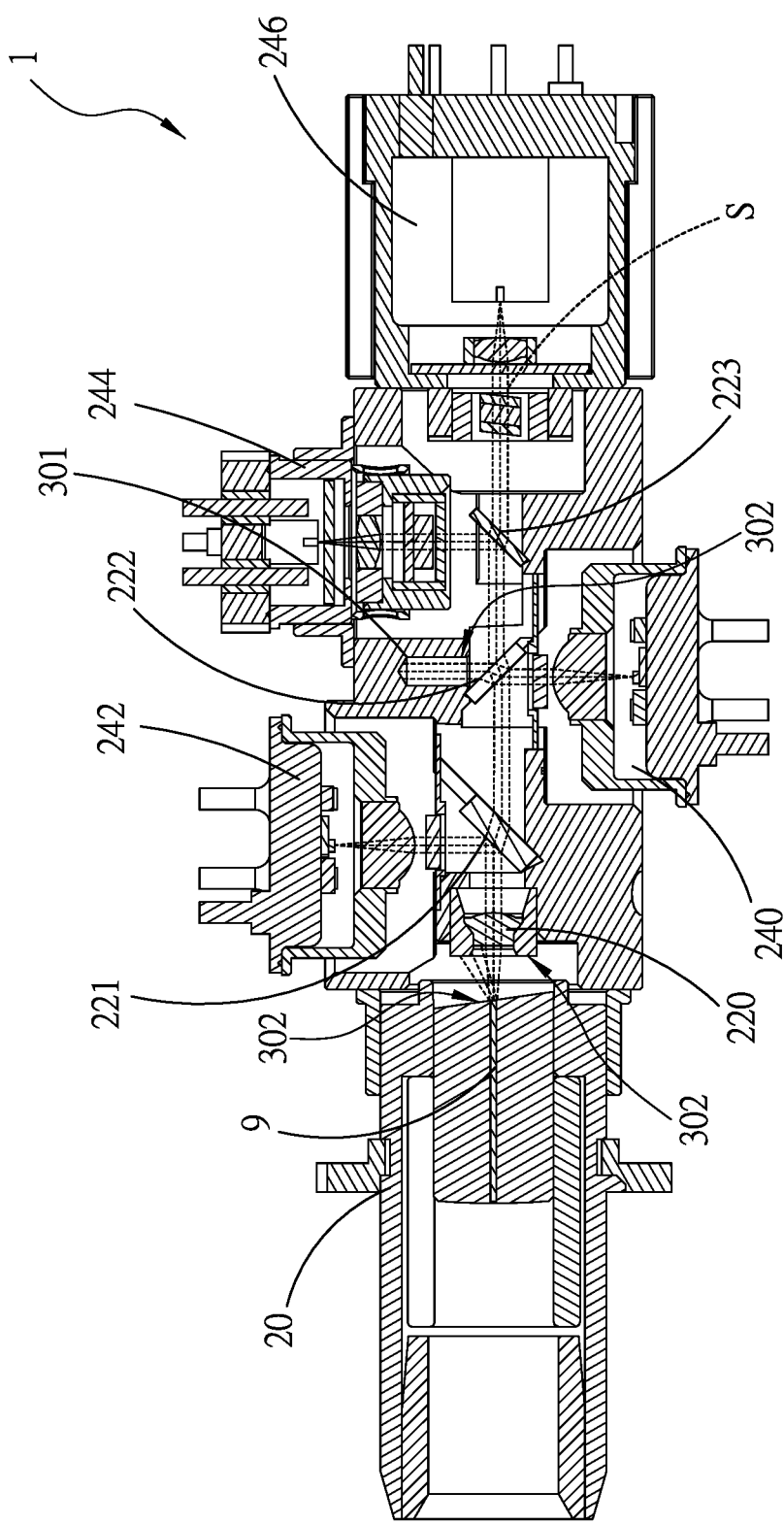
FIG. 2 is a schematic diagram of the structure of the optical path in a cross-sectional view of the optical transmission device of the present invention.

Firstly, the appearance and some functions of the optical transmission device in this case will be described. Referring to FIG. 2, it is a schematic diagram of the structure of the optical transmission device according to the present invention. The optical transmission device 2 includes an optical guiding unit 20, an optical pathway conversion unit 22, and an optical transceiver unit. The optical guiding unit 20 is connected to the optical fiber 9 and is used to transmit optical signals. The optical pathway conversion unit 22 is connected to the optical guiding unit 20 and is used to receive optical signals and change the optical pathway of the optical signals. The optical transceiver unit is used to receive and transmit optical signals and includes a first receiving element 240, a second receiving element 242, a third transmitting element 244, and a fourth transmitting element 246. The first and second receiving elements 240 and 242 are respectively corresponding to one of the third and fourth transmitting elements 244 and 246. In other words, the receiving elements and transmitting elements are paired, and the installation positions of the receiving and transmitting elements shown in FIG. 2 are only schematic diagrams in the embodiment. The actual installation positions are determined according to the layout requirements.

Continuing with reference to FIG. 2, the internal structure of the optical transmission device in this case is further revealed through a sectional view. The optical transmission device 2 includes an optical guiding unit 20, an optical path conversion unit 22, and an optical reception/transmission unit. The optical path conversion unit 22 is connected to the optical guiding unit 20, and sequentially includes a focusing lens 220, a first filter 221, a second filter 222, and a third filter 223, all of which are oriented towards the optical guiding unit 20. The optical reception/transmission unit includes a first receiver 240, a second receiver 242, a third transmitter 244, and a fourth transmitter 246. The first receiver 240 corresponds to the first filter 221, the second receiver 242 corresponds to the second filter 222, the third transmitter 244 corresponds to the third filter 223, and the fourth transmitter 246 corresponds to the third filter 223.

The design positions of the aforementioned filters, receivers, and transmitters will now be further explained. It should be noted that since the device in which this module is installed is a design that integrates the optical time domain reflectometer into the optical reception/transmission module, the main consideration when positioning the elements is how to arrange the placement of the optical time domain reflectometer in the paired receivers and transmitters in order to simplify the arrangement of the components and reduce the overall space while achieving excellent results. In this case, the primary concern is whether the transmission path of the optical signal can reach its destination correctly. If the optical signal is abnormally reflected during transmission, it will inevitably reduce the transmission efficiency and affect the detection effect. Therefore, appropriate installation space must be provided for the receivers and/or transmitters. However, any movement of the receivers and/or transmitters will increase the collision between the components. In addition, when the receivers and/or transmitters are moved, the focusing lens and filters inside the optical path conversion unit must also be adjusted accordingly. To reduce the effect of optical reflection on signal transmission, this has become a major challenge in the design of the optical transmission device in this case.

Under the considerations mentioned above, the detailed path of light in the optical path conversion unit will be further explained here with reference to FIG. 2. Since the filtering wavelength of each filter is determined according to the requirements of the corresponding receiving and/or transmitting components, only the angles of each filter will be described in this case. The angle of the filter is defined by the angle at which light enters the filter. That is, in the optical transmission device 2 of this case, when the light signal S (dotted line) is transmitted to the first filter 220, the incident angle of the light signal S entering the first filter 221 is between 40 degrees and 50 degrees. When the light signal S is transmitted to the second filter 222, the incident angle of the light signal S entering the second filter 222 is between 40 degrees and 50 degrees. When the light signal S is transmitted to the third filter 223, the incident angle of the light signal S entering the third filter 223 is between 40 degrees and 50 degrees. However, in this embodiment, only the incident angle of 45 degrees is shown for reference. It should be noted that the above arrangement is not the actual order of the light path, which depends on the requirements.

In the optical transmission device of this case, the first receiving component receives a wavelength range of 1260 to 1280 nm. The second receiving component receives a wavelength range of 1615 to 1660 nm. The third transmitting component emits a wavelength range of 1615 nm to 1660 nm. The fourth transmitting component emits a wavelength range of 1575 nm to 1580 nm. Therefore, if the third transmitting component and the second receiving component are used as the transmitting and receiving components for optical time domain reflectometry (OTDR), their corresponding optical signal wavelengths can be used to check the condition of the optical fiber line. For example, if the wavelength for OTDR to check the condition of the optical fiber line is 1650 nm, the third transmitting component needs to emit light with a wavelength of 1650 nm, and the second receiving component needs to receive the light signal with a wavelength of 1650 nm. However, this design of the optical path can easily cause crosstalk in the receiver. In other words, the second receiving component will receive scattered light reflected by various contact surfaces when the 1650 nm emission light encounters them, thus causing distortion of the received signal. More specifically, the second filter needs to enable 1650 nm light to simultaneously penetrate and reflect, and different configurations with different ratios of transmittance and reflectance, such as 70% transmittance and 30% reflectance or 50% transmittance and 50% reflectance, can be designed according to requirements. To reduce the influence of crosstalk, an optical absorption unit is provided in this case to improve the above-mentioned problem.

Please refer to FIG. 2 for the following. The light absorption unit includes an escape hole 301 and an absorption coating 302. The escape hole 301 corresponds to the second filter 222. Specifically, the escape hole 301 is located on the opposite side of the second filter 222 and the second receiver 242, which is the opposite side of the optical time-domain detection receiver. The surface of the escape hole 301 is coated with the absorption coating 302. With this setup, when the optical time-domain detection signal passes through the second filter 222, the reflected light signal will enter the escape hole 301 and be absorbed by the absorption coating 302, thus greatly improving the optical crosstalk caused by reflected light. Additionally, when the optical time-domain detection signal passes through the optical fiber 9, since its converged light size is larger than the diameter of the optical fiber 9, a portion of the light will reflect off the plug insertion surface. To avoid this, the absorption coating 302 is also applied around the surface of the optical guiding unit 20 and the focusing lens to absorb most of the scattered light and prevent optical crosstalk.

Figure 3:
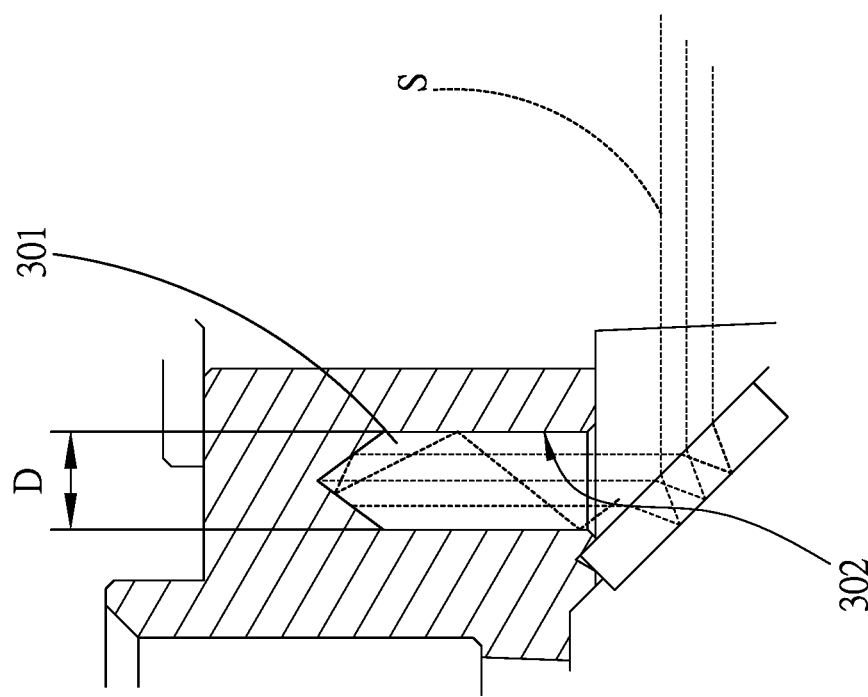
FIG. 3 is a schematic diagram of the structure of the optical path in a cross-sectional view of the escape hole of the optical transmission device of the present invention.
Figure 4:
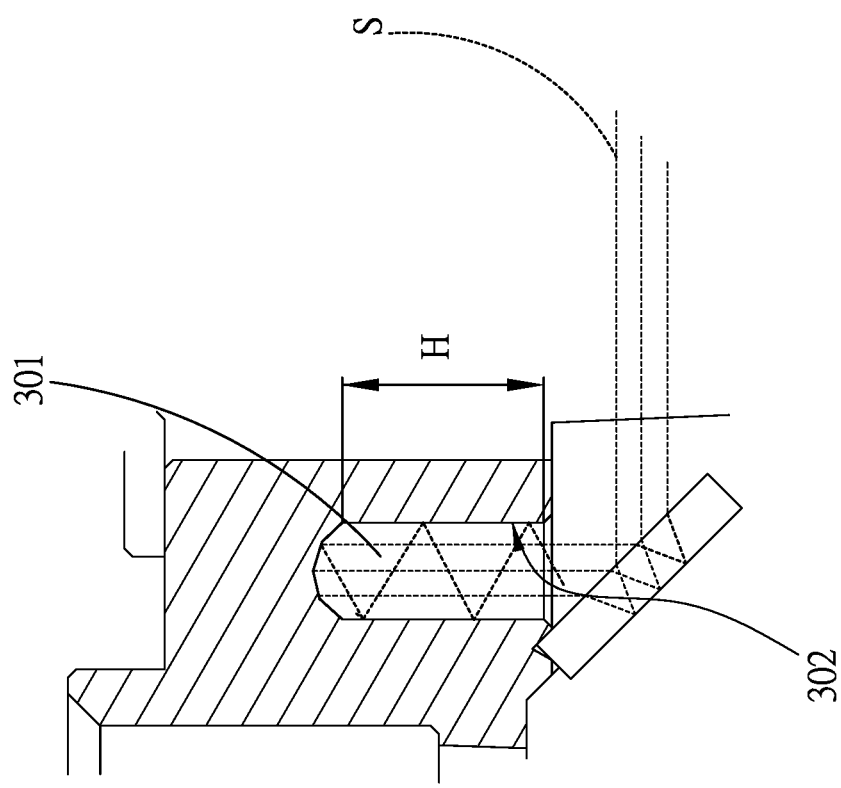
FIG. 4 is a schematic diagram of the structure of the optical path in a cross-sectional view of the escape hole of the optical transmission device of the present invention.
Figure 5:
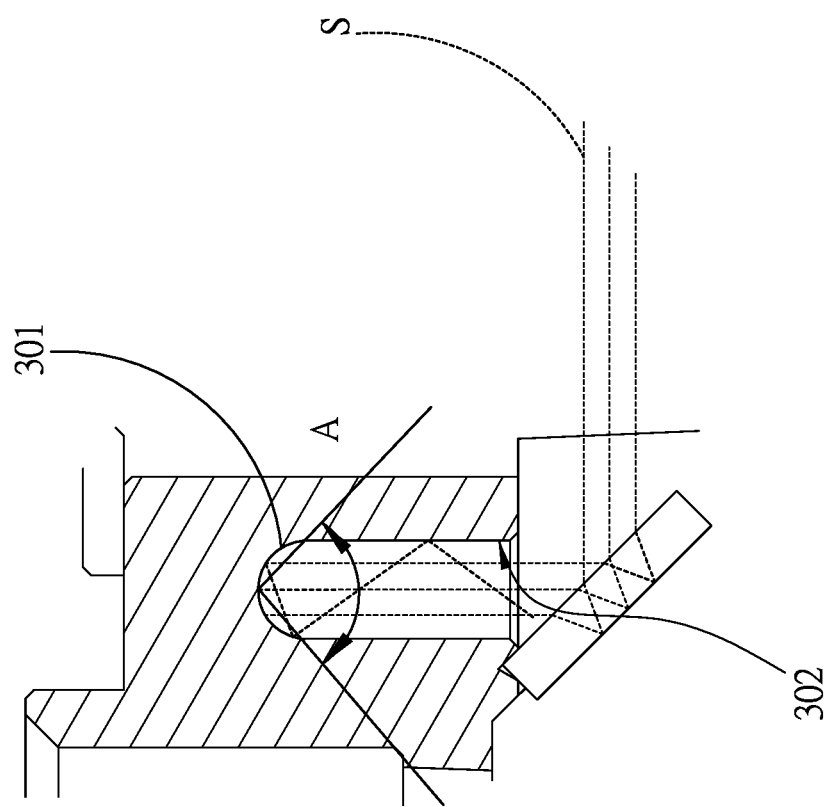
FIG. 5 is a schematic diagram of the structure of the optical path in a cross-sectional view of the escape hole of the optical transmission device of the present invention.

Next, the structure of the escape hole 301 in this invention will be further described. Please refer to FIGS. 3, 4, and 5. FIG. 3 is a schematic cross-sectional view of the light path structure of the escape hole of the optical transmission device in this invention. FIG. 4 is another schematic cross-sectional view of the escape hole of the optical transmission device in this invention. FIG. 5 is yet another schematic cross-sectional view of the escape hole of the optical transmission device in this invention. Firstly, the escape hole 301 in this invention is a blind hole. As mentioned earlier, the surface of the escape hole 301 is coated with the absorption coating 302. The escape hole 301 has a depth H, an opening diameter D, and a blind hole angle A. The depth H is between 1 mm and 2 mm, the opening diameter D is between 0.5 mm and 1 mm, and the blind hole angle A is between 60 degrees and 120 degrees. It should be noted that as shown in FIGS. 3, 4, and 5, the bottom of the escape hole 301 can be a triangular pyramid, a polygonal pyramid, or a hemisphere. The exact shape of the escape hole 301 is not limited in this invention, as long as it can achieve the effect of refracting the light back and forth inside the escape hole 301, it is within the scope of the patent application.

Figure 6:
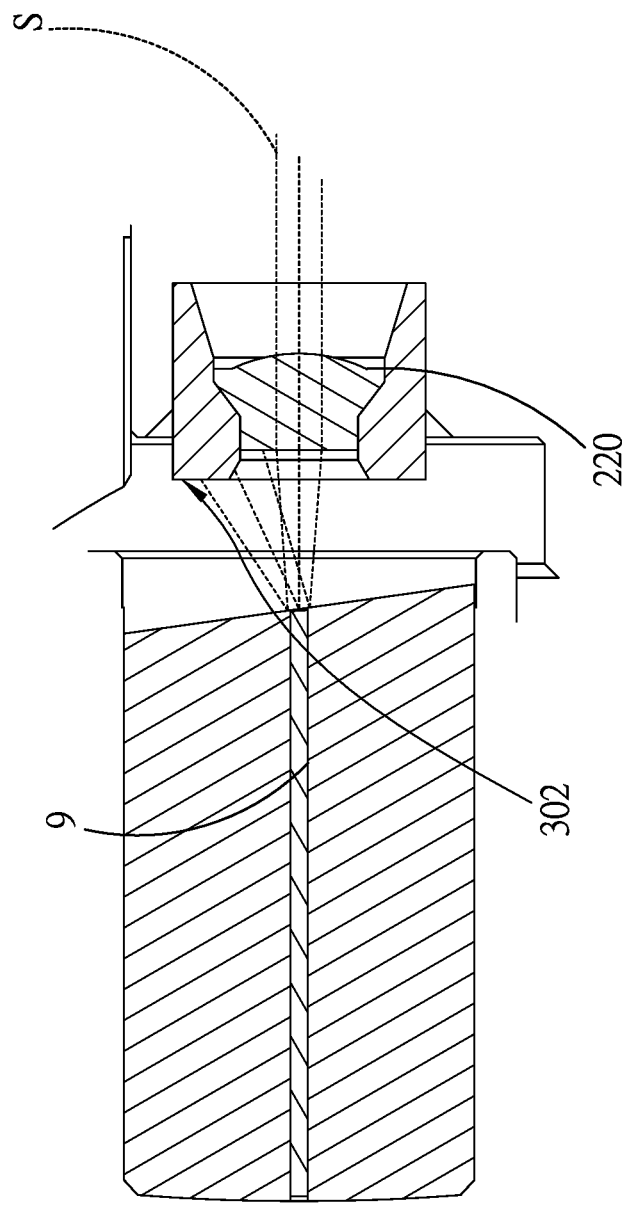
FIG. 6 is a schematic diagram of the structure of the optical path in a cross-sectional view of the absorption coating of the optical transmission device of the present invention.

Furthermore, please refer to FIG. 6, which is a schematic diagram of the optical path of a cross-sectional view of the absorbing layer of the optical transmission device disclosed herein. It should be noted that the absorbing layer 302 around the focusing lens 220 is determined based on the opening angle of the optical fiber 9, as shown in the figure. If the opening of the optical fiber faces upward toward the focusing lens 220, then the corresponding absorbing layer 302 will be placed above it.

Therefore, the present disclosure is for a optical transmission device with the following advantages:

1. Combining the optical time-domain reflectometer (OTDR) and the optical transceiver module in the same device and designing a specific wavelength range of light signals as the detection pulse light, allows for transmission and detection of the optical network within the original space of the optical transmission device.

2. By integrating the OTDR into the optical transceiver device, it reduces the space cost of the overall structure and also reduces the cost of installing an additional OTDR.

3. By setting up the optical absorption unit, when the OTDR light signal is reflected, it can be absorbed by the optical absorption unit, reducing the occurrence of light signal scattering and lowering the problem of optical crosstalk.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An optical transmission device comprising:
a light guiding unit connected to an optical fiber and adapted to transmit at least one optical signal, wherein the at least one optical signal is not a single wavelength;
a light path conversion unit connected to the light guiding unit and adapted to receive the at least one optical signal and change the optical path of the at least one optical signal, wherein the light path conversion unit sequentially includes a focusing lens, a first filter, a second filter, and a third filter in a direction towards the light guiding unit; and
a light receiving and transmitting unit adapted to receive and transmit the at least one optical signal, the light receiving and transmitting unit including:
a first receiving element corresponding to the first filter;
a second receiving element corresponding to the second filter;
a third transmitting element corresponding to the third filter; and
a fourth transmitting element corresponding to the third filter, wherein the first receiving element and the second receiving element are respectively set corresponding to one of the third transmitting element and the fourth transmitting element; and
a light absorption unit adapted to absorb light signals in a fixed wavelength range, the light absorption unit comprising:
a light escape hole corresponding to the second filter; and
an absorption coating disposed around the light escape hole, the focusing lens, and at least part of the surface of the light guiding unit.

2. The optical transmission device of claim 1, wherein when the at least one optical signal is transmitted to the first filter, the incident angle of the at least one optical signal entering the first filter is between 40 degrees and 50 degrees.

3. The optical transmission device of claim 1, wherein when the at least one optical signal is transmitted to the second filter, the incident angle of the at least one optical signal entering the second filter is between 40 degrees and 50 degrees.

4. The optical transmission device of claim 1, wherein when the at least one optical signal is transmitted to the third filter, the incident angle of the at least one optical signal entering the third filter is between 40 degrees and 50 degrees.

5. The optical transmission device of claim 1, wherein the first receiving element receives a wavelength range between 1260 nm and 1280 nm.

6. The optical transmission device of claim 1, wherein the second receiving element receives a wavelength range between 1615 nm and 1660 nm.

7. The optical transmission device of claim 1, wherein the third transmitting element transmits a wavelength range between 1615 nm and 1660 nm.

8. The optical transmission device of claim 1, wherein the fourth transmitting element transmits a wavelength range between 1575 nm and 1580 nm.

9. The optical transmission device of claim 1, wherein the optical absorption unit absorbs light signals at least partially reflected from the second filter.

10. An optical transmission device as claimed in claim 1, wherein the optical absorption unit absorbs light signals at least partially reflected from the surface of the light guiding unit.

11. An optical transmission device as claimed in claim 1, wherein the light escape hole has a depth ranging from 1 mm to 2 mm.

12. An optical transmission device as claimed in claim 1, wherein the light escape hole has an opening diameter ranging from 0.5 mm to 1 mm.

13. An optical transmission device as claimed in claim 1, wherein the light escape hole has a blind hole angle ranging from 60 degrees to 120 degrees.

14. The optical transmission device of claim 1, wherein the optical path conversion unit is configured to:
transmit a first optical signal for data communication;
transmit a second optical signal for OTDR measurement; and
receive reflected portions of the second optical signal for OTDR measurement without interrupting transmission of the first optical signal.

15. The optical transmission device of claim 14, wherein:
the first optical signal has a wavelength range between 1260 nm and 1360 nm; and
the second optical signal has a wavelength range between 1615 nm and 1660 nm.

16. The optical transmission device of claim 1, wherein the absorption coating comprises a multi-layer structure including:
a first layer comprising a metal oxide; and
a second layer comprising a non-reflective material having a refractive index lower than the metal oxide.

17. The optical transmission device of claim 16, wherein:
the metal oxide comprises at least one of titanium oxide and aluminum oxide; and
the non-reflective material comprises at least one of silicon oxide and magnesium fluoride.

18. The optical transmission device of claim 1, wherein the light escape hole comprises:
a first section having a cylindrical shape with the opening diameter; and
a second section having a conical shape defining the blind hole angle.

19. The optical transmission device of claim 18, wherein the absorption coating is disposed:
on an inner surface of both the first section and the second section of the light escape hole;
around an outer perimeter of the light escape hole opening; and
on adjacent surfaces of the light guiding unit surrounding the light escape hole.

20. The optical transmission device of claim 1, wherein the light absorption unit is configured to absorb at least 95% of incident light within the fixed wavelength range.

* * * * *